(12) United States Patent
Li

(10) Patent No.: US 10,091,607 B2
(45) Date of Patent: Oct. 2, 2018

(54) ELECTRONIC DEVICE PAIRING

(71) Applicant: Lenovo (Beijing) Limited, Beijing (CN)

(72) Inventor: Fan Zhi Li, Beijing (CN)

(73) Assignee: Lenovo (Beijing) Limited, Beijing (CN)

( * ) Notice: Subject to any disclaimer, the term of this patent is extended or adjusted under 35 U.S.C. 154(b) by 0 days.

(21) Appl. No.: 15/472,968

(22) Filed: Mar. 29, 2017

(65) Prior Publication Data

US 2017/0289744 A1 Oct. 5, 2017

(30) Foreign Application Priority Data

Mar. 29, 2016 (CN) .......................... 2016 1 0189210

(51) Int. Cl.
| | |
|---|---|
| *H04W 8/00* | (2009.01) |
| *H04M 1/23* | (2006.01) |
| *H04W 4/00* | (2018.01) |
| *H04L 29/08* | (2006.01) |
| *H04W 4/80* | (2018.01) |

(52) U.S. Cl.
CPC ........... *H04W 4/008* (2013.01); *H04L 67/303* (2013.01); *H04W 4/80* (2018.02); *H04W 8/005* (2013.01)

(58) Field of Classification Search
CPC ..... H04W 4/008; H04W 8/005; H04W 76/02; H04L 67/303; H04B 2201/71346; H04M 1/233; H04M 2017/2531; H04M 2250/02; H04M 1/6066
See application file for complete search history.

(56) References Cited

U.S. PATENT DOCUMENTS

| | | | | |
|---|---|---|---|---|
| 9,164,599 | B2 | 10/2015 | Dowd et al. | |
| 9,189,084 | B2 * | 11/2015 | Hicks | G06F 3/033 |
| 9,665,206 | B1 * | 5/2017 | Missig | G06F 3/0416 |
| 2013/0195426 | A1 * | 8/2013 | Kamotani | H04N 9/79 386/241 |
| 2014/0256250 | A1 * | 9/2014 | Cueto | H04B 5/0031 455/41.1 |
| 2015/0050879 | A1 * | 2/2015 | MacDuff | H04W 12/06 455/39 |
| 2015/0324025 | A1 * | 11/2015 | Shin | G06F 3/041 345/173 |
| 2016/0337496 | A1 * | 11/2016 | Jeganathan | H04M 1/7253 |
| 2016/0357339 | A1 * | 12/2016 | Ritchey | G06F 3/041 |
| 2017/0262084 | A1 * | 9/2017 | Qiao | G06F 3/03545 |

FOREIGN PATENT DOCUMENTS

| | | |
|---|---|---|
| CN | 101877602 A | 11/2010 |
| CN | 107624247 A | 1/2018 |
| WO | 2015013546 A1 | 1/2015 |

* cited by examiner

*Primary Examiner* — Andrew Wendell
(74) *Attorney, Agent, or Firm* — Ference & Associates LLC

(57) ABSTRACT

One embodiment provides a method, including: detecting, at an electronic device, a wireless signal associated with an input device; identifying, using a processor, a data set corresponding to the wireless signal; analyzing the data set to determine an identity characteristic of the input device; and pairing, based on the analyzing, the electronic device with the input device. Other aspects are described and claimed.

20 Claims, 4 Drawing Sheets

ELECTRONIC DEVICE PAIRING

CLAIM FOR PRIORITY

This application claims priority to Chinese Application No. 201610189210.9, filed on Mar. 29, 2016, which is fully incorporated by reference herein.

FIELD

The subject matter described herein relates to the field of communication technology, more specifically, it relates to a pairing method and an electronic device.

BACKGROUND

Presently, the manner in which content is input into a touch screen of a touch screen device is becoming increasingly diversified. For example, a user may use a finger or a stylus to perform a touch input on the touch screen. In order to improve accuracy of the input, a wireless stylus with a small nib (for example, a Bluetooth stylus) is widely applied. After the wireless stylus is paired with the touch screen, an electronic device can sense and identify a touch point of the wireless stylus and perform an operation when the wireless stylus gets close to or touches the touch screen of the electronic device.

BRIEF SUMMARY

In summary, one aspect provides a method, comprising: detecting, at an electronic device, a wireless signal associated with an input device; identifying, using a processor, a data set corresponding to the wireless signal; analyzing the data set to determine an identity characteristic of the input device; and pairing, based on the analyzing, the electronic device with the input device.

Another aspects provides an electronic device, comprising: a processor; a memory device that stores instructions executable by the processor to: detect a wireless signal associated with an input device; identify a data set corresponding to the wireless signal; analyze the data set to determine an identity characteristic of the input device; and pairing, based on the analyzing, the electronic device with the input device.

A further aspect provides a product, comprising: a storage device that stores code, the code being executable by a processor and comprising: code that detects a wireless signal associated with an input device; code that identifies a data set corresponding to the wireless signal; code that analyzes the data set to determine an identity characteristic of the input device; and code that pairs, based on the analyzing, an electronic device with the input device.

The foregoing is a summary and thus may contain simplifications, generalizations, and omissions of detail; consequently, those skilled in the art will appreciate that the summary is illustrative only and is not intended to be in any way limiting.

For a better understanding of the embodiments, together with other and further features and advantages thereof, reference is made to the following description, taken in conjunction with the accompanying drawings. The scope of the invention will be pointed out in the appended claims.

DETAILED DESCRIPTION

It will be readily understood that the components of the embodiments, as generally described and illustrated in the figures herein, may be arranged and designed in a wide variety of different configurations in addition to the described example embodiments. Thus, the following more detailed description of the example embodiments, as represented in the figures, is not intended to limit the scope of the embodiments, as claimed, but is merely representative of example embodiments.

Reference throughout this specification to "one embodiment" or "an embodiment" (or the like) means that a particular feature, structure, or characteristic described in connection with the embodiment is included in at least one embodiment. Thus, the appearance of the phrases "in one embodiment" or "in an embodiment" or the like in various places throughout this specification are not necessarily all referring to the same embodiment.

Furthermore, the described features, structures, or characteristics may be combined in any suitable manner in one or more embodiments. In the following description, numerous specific details are provided to give a thorough understanding of embodiments. One skilled in the relevant art will recognize, however, that the various embodiments can be practiced without one or more of the specific details, or with other methods, components, materials, et cetera. In other instances, well known structures, materials, or operations are not shown or described in detail to avoid obfuscation.

Conventionally, a wireless stylus must be manually paired with the touch screen before the wireless stylus is used. The process of pairing the wireless stylus with the touch screen is complicated, especially when a user does not know how to pair, which will result in the user being unable to use the wireless stylus to operate the touch screen.

Figure 1:
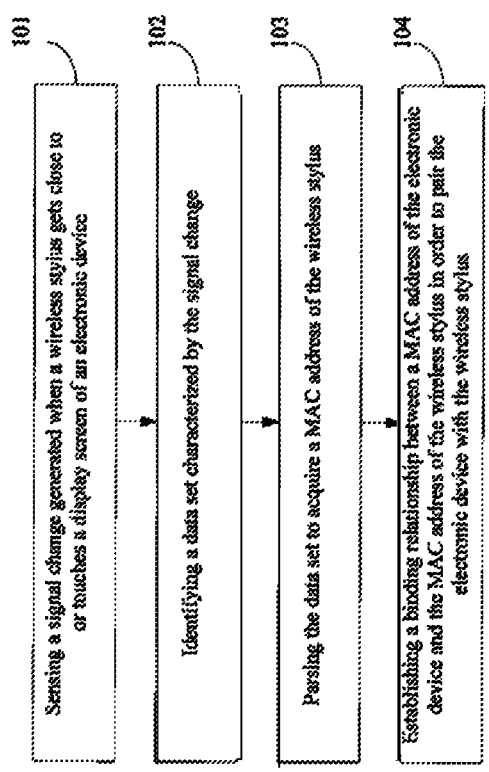
FIG. 1 is a schematic flow diagram illustrating a pairing method according to an embodiment.

Referring to FIG. 1, a pairing method according to an embodiment is illustrated. In an embodiment, the pairing method may be applied to an electronic device. The electronic device may be a device that has a touch screen, such as a mobile phone, a notebook computer, a tablet computer and the like.

At step 101, in an embodiment, a signal change is generated when a wireless stylus gets close to or touches a display screen of the electronic device is sensed. It should be understood that the wireless stylus is unable to perform wireless communication with the electronic device before being paired with the electronic device. For example, the electronic device is unable to receive a wireless control command and the like transmitted by the wireless stylus. However, since the wireless stylus generally includes a conductor and has a function of emitting an electromagnetic wave, or the like, a signal change is generated on the display screen when the wireless stylus gets close to or touches the display screen of the electronic device. Because the processes of identifying the input of the wireless stylus by the electronic device are different, possibilities of the signal change generated when the wireless stylus gets close to the display screen are different.

In an embodiment, a capacitive signal change generated when the wireless stylus gets close to or touches the display screen of the electronic device may be sensed. For example, since the wireless stylus has a capability of emitting an electrical field, a capacitive change is generated on the display screen when the wireless stylus gets close to or touches the display screen.

In an embodiment, an electromagnetic wave signal output during a process of the wireless stylus getting close or touching the display screen of the electronic device may be sensed, and signal change information on the electromagnetic wave signal may be acquired. For example, since the wireless stylus includes an electromagnetic emission unit and may emit an electromagnetic field, an electromagnetic wave signal sensed on the display screen changes when the wireless stylus gets close to or touches the display screen of the electronic device.

At step 102, in an embodiment, a data set characterized by the signal change is identified. It should be understood that different signal changes may characterize different data. In this case, the wireless stylus outputs data to be output to the electronic device in a way which enables the electronic device to sense the signal change.

At step 103, in an embodiment, the data set is parsed to acquire a MAC address of the wireless stylus. In an embodiment, the data set characterized by the signal change may be data corresponding to a Media Access Control (MAC) address of the wireless stylus, or may be a data set including the MAC address of the wireless stylus.

At step 104, in an embodiment, a binding relationship between a MAC address of the electronic device and the MAC address of the wireless stylus is established in order to pair the electronic device with the wireless stylus. After the MAC address of the wireless stylus is determined, the electronic device is triggered to establish the binding relationship between the MAC address of the electronic device and the MAC address of the wireless stylus, thereby automatically pairing the electronic device with the wireless stylus. The manner for establishing the binding relationship between the MAC address of the electronic device and the MAC address of the wireless stylus is the same as the existing manner. For example, a correspondence between the MAC address of the electronic device and the MAC address of the wireless stylus may be stored in the electronic device. Alternatively, the MAC address of the wireless stylus may be stored as a MAC address of a paired device.

In an embodiment, the electronic device senses the signal change generated when the wireless stylus gets close to or touches the display screen. In an embodiment, the electronic device then determines the data characterized by the signal change and parses the data to acquire the MAC address of the wireless stylus, such that the electronic device automatically extracts the MAC address of the wireless stylus. In an embodiment, the electronic device then automatically establishes a pairing relationship between the MAC address of the wireless stylus and the MAC address of the electronic device, thereby avoiding complexity of a user manually pairing the electronic device with the wireless stylus, and improving convenience and efficiency of the pairing.

In an embodiment, in order to reduce the possibility of the sensed signal being influenced due to a factor such as interference, a specified spatial range of the display screen may be set, in advance, as a preset sensing region. In this case, the signal change generated when the wireless stylus gets close to or touches the display screen may be sensed within the specified spatial range of the display screen of the electronic device.

In an embodiment, the specified spatial range may be set as needed. Generally, a region including the display screen and a spatial range above the display screen may be set as the specified spatial range.

It should be understood that there are multiple ways of producing the signal change. For example, in an embodiment, a position change of an action point of the signal. As another example, in an embodiment, signal intensity change information generated when the wireless stylus gets close to or touches the display screen may be sensed. Accordingly, the electronic device may determine data characterized by a signal intensity change based on the signal intensity change information. Furthermore, in an embodiment, the electronic device may sense signal intensity change information on a specified signal generated when the wireless stylus gets close to or touches the display screen. For example, the specified signal may be an electromagnetic signal, a capacitive signal or the like. The electronic device analyzes data characterized by a signal intensity change of the specified signal if the signal intensity change information on the specified signal generated when the wireless stylus gets close to or touches the display screen is sensed.

In an embodiment, the signal intensity change may refer to a signal intensity change in a specified direction, or may refer to a change in an average value of signal intensities in all directions of the signal. In any one of the aforementioned embodiments, the data characterized by the signal change is the MAC address of the wireless stylus. Alternatively, a part of the data characterized by the signal change is the MAC address of the wireless stylus.

It should be understood that the existing wireless stylus has a stylus identifier, and the electronic device can identify the stylus identifier of the wireless stylus. Hence, in an embodiment, the stylus identifier of the wireless stylus may carry the MAC address of the wireless stylus.

Figure 2:
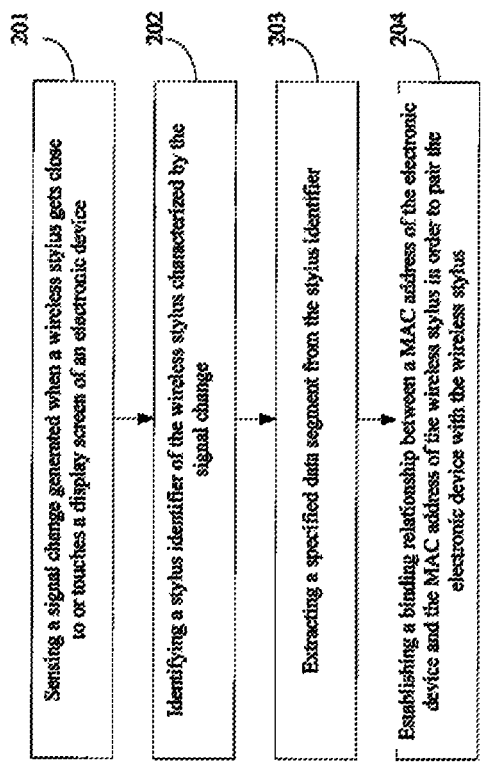
FIG. 2 is a schematic flow diagram illustrating a pairing method according to another embodiment.

Referring now to FIG. 2, a pairing method according to an embodiment is illustrated. At step 201, in an embodiment, a signal change generated when a wireless stylus gets close to or touches a display screen of the electronic device is sensed. In an embodiment, a signal intensity change generated when the wireless stylus gets close to or touches the display screen of the electronic device is sensed. For example, a signal intensity change of a capacitive signal generated when the wireless stylus gets close to or touches the display screen of the electronic device is sensed. As another example, a signal intensity change of an electromagnetic wave signal generated when the wireless stylus gets close to or touches the display screen is sensed.

At step 202, in an embodiment, a stylus identifier of the wireless stylus characterized by the signal change is identified. The stylus identifier is a unique identifier for identifying the wireless stylus. In an embodiment, a form of the stylus identifier may be set according to actual needs. Specifically, the form of the stylus identifier may be similar to a composition of the stylus identifier of the existing wireless stylus. For example, the stylus identifier may be a series of strings.

In an embodiment, the electronic device identifies the stylus identifier of the wireless stylus based on the signal change sensed by the touch screen. The process of identifying the stylus identifier is similar to the existing process of identifying a stylus identifier of the touch screen. For example, in an embodiment, data characterized by the signal sensed by the touch screen may be identified based on the signal intensity change, and the data is determined as the stylus identifier of the wireless stylus.

At step 203, in an embodiment, a specified data segment is extracted from the stylus identifier. In an embodiment, the specified data segment includes the MAC address of the wireless stylus. In an embodiment, the stylus identifier includes the MAC address of the wireless stylus. Specifically, the stylus identifier may include the MAC address of the wireless stylus, or the stylus identifier is a unique identifier for identifying the wireless stylus composed of data including the MAC address of the wireless stylus. In an embodiment, after the stylus identifier is determined, data characterizing the MAC address of the wireless stylus may be extracted from the stylus identifier. For example, if the specified data segment in the stylus identifier of the wireless stylus represents the MAC address of the wireless stylus, data in the specified data segment may be extracted to obtain the MAC address of the wireless stylus. For example, the stylus identifier may be a continuous string, and last six bytes of the string may represent the MAC address.

At step 204, in an embodiment, a binding relationship between a MAC address of the electronic device and the MAC address of the wireless stylus is established in order to pair the electronic device with the wireless stylus. In an embodiment, when the stylus identifier of the wireless touch screen carries the MAC address of the wireless stylus, the electronic device may directly extract the MAC address of the wireless stylus from the stylus identifier after determining the stylus identifier based on the sensed signal change. The existing electronic device may have the function of identifying the stylus identifier, such that the electronic device automatically acquires the MAC address of the wireless stylus when there is less program development, and further establishes the binding relationship between the MAC address of the wireless stylus and the MAC address of the electronic device.

In an embodiment, the wireless stylus may be a stylus which can transmit any wireless signal. In an embodiment, in consideration of maturity of the Bluetooth technology, low power consumption of the Bluetooth and the like, the wireless stylus may be a Bluetooth stylus. The Bluetooth stylus includes a Bluetooth module and transmits a Bluetooth signal by way of the Bluetooth module. Particularly, after the Bluetooth stylus is paired with the electronic device, a user may transmit a Bluetooth signal carrying an input instruction to the electronic device by way of the Bluetooth stylus.

Figure 3:
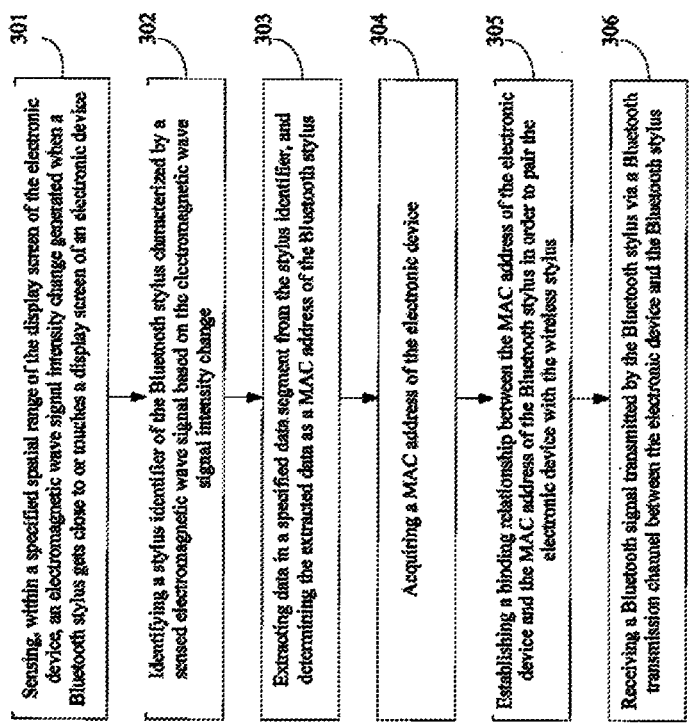
FIG. 3 is a schematic flow diagram illustrating a pairing method according to yet another embodiment.

Referring now to FIG. 3, a pairing method according to an embodiment is illustrated. At step 301, in an embodiment, an electromagnetic wave signal intensity change generated when a Bluetooth stylus gets close to or touches a display screen of an electronic device is sensed within a specified spatial range of the display screen of the electronic device.

At step 302, in an embodiment, a stylus identifier of the Bluetooth stylus characterized by a sensed electromagnetic wave signal is identified based on the electromagnetic wave signal intensity change. At step 303, in an embodiment, data in a specified data segment is extracted from the stylus identifier, and the extracted data is determined as a MAC address of the Bluetooth stylus. At step 304, in an embodiment, a MAC address of the electronic device is acquired. At step 305, in an embodiment, a binding relationship between the MAC address of the electronic device and the MAC address of the Bluetooth stylus is established in order to pair the electronic device with the wireless stylus. At step 306, in an embodiment, a Bluetooth signal transmitted by the Bluetooth stylus is received via a Bluetooth transmission channel between the electronic device and the Bluetooth stylus. The Bluetooth signal may carry a control instruction, an input instruction or the like.

In an embodiment, the stylus identifier is determined based on the sensed electromagnetic wave signal intensity change, however, the stylus identifier may also be determined by sensing a capacitive signal intensity change.

Figure 4:
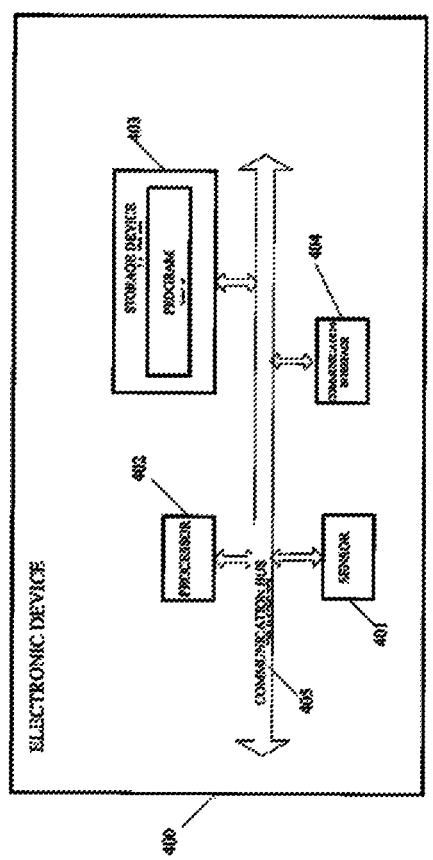
FIG. 4 is a structural schematic diagram showing an electronic device according to an embodiment.

Referring now to FIG. 4, a structural schematic diagram of an electronic device according to an embodiment is illustrated. The electronic device 400 according to the embodiment may include a sensor 401 and a processor 402. The sensor 401 is configured to sense a signal change generated when a wireless stylus gets close to or touches a display screen of an electronic device. The processor 402 is configured to identify a data set characterized by the signal change, parse the data set to acquire a MAC address of the wireless stylus, and establish a binding relationship between a MAC address of the electronic device and the MAC address of the wireless stylus in order to pair the electronic device with the wireless stylus. The processor 402 may be a Central Processing Unit (CPU) or an Application Specific Integrated Circuit (ASIC), or may be one or more integrated circuits configured to implement the aforementioned embodiments.

In an embodiment, the sensor of the electronic device senses the signal change generated when the wireless stylus gets close to or touches the display screen. In an embodiment, the processor determines data characterized by the signal change and parses the data to acquire the MAC address of the wireless stylus, such that the electronic device automatically extracts the MAC address of the wireless stylus. Subsequently, the electronic device automatically establishes a pairing relationship between the MAC address of the wireless stylus and the MAC address of the electronic device, thereby avoiding complexity of a user manually pairing the electronic device with the wireless stylus, and improving convenience and efficiency of the pairing.

In an embodiment, the electronic device may further include a storage device 403. The storage device is configured to store a program and data required when the processor operates. The program may include a program code, and the program code includes a computer operation instruction. In an embodiment, the electronic device may further include a communication interface 404. In an embodiment, the electronic device may further include a communication bus 405, and the communication bus 405 is configured to connect the sensor 401, the processor 402, the storage device 403 and the communication interface 404 together.

In an embodiment, the wireless stylus may be a Bluetooth stylus. In an embodiment, the sensor may be configured to sense signal intensity change information generated when the wireless stylus gets close to or touches the display screen. In an embodiment, the sensor being configured to sense the signal change generated when the wireless stylus gets close to or touches the display screen may include being configured to sense a capacitive signal change generated when the wireless stylus gets close to or touches the display screen of the electronic device. In an embodiment, the sensor being configured to sense the signal change generated when the wireless stylus gets close to or touches the display screen may include being configured to sense an electromagnetic wave signal output during a process of the wireless stylus getting close to or touching the display screen of the electronic device, and acquire signal change information on the electromagnetic wave signal. In an embodiment, the processor being configured to identify a data set characterized by the signal change may include being configured to:

identify a stylus identifier of the wireless stylus characterized by the signal change; and extract a specified data segment from the stylus identifier, wherein the specified data segment comprises the MAC address of the wireless stylus.

As will be appreciated by one skilled in the art, various aspects may be embodied as a system, method or device program product. Accordingly, aspects may take the form of an entirely hardware embodiment or an embodiment including software that may all generally be referred to herein as a "circuit," "module" or "system." Furthermore, aspects may take the form of a device program product embodied in one or more device readable medium(s) having device readable program code embodied therewith.

It should be noted that the various functions described herein may be implemented using instructions stored on a device readable storage medium such as a non-signal storage device that are executed by a processor. A storage device may be, for example, an electronic, magnetic, optical, electromagnetic, infrared, or semiconductor system, apparatus, or device, or any suitable combination of the foregoing. More specific examples of a storage medium would include the following: a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a storage device is not a signal and "non-transitory" includes all media except signal media.

Program code embodied on a storage medium may be transmitted using any appropriate medium, including but not limited to wireless, wireline, optical fiber cable, RF, et cetera, or any suitable combination of the foregoing.

Program code for carrying out operations may be written in any combination of one or more programming languages. The program code may execute entirely on a single device, partly on a single device, as a stand-alone software package, partly on single device and partly on another device, or entirely on the other device. In some cases, the devices may be connected through any type of connection or network, including a local area network (LAN) or a wide area network (WAN), or the connection may be made through other devices (for example, through the Internet using an Internet Service Provider), through wireless connections, e.g., near-field communication, or through a hard wire connection, such as over a USB connection.

Example embodiments are described herein with reference to the figures, which illustrate example methods, devices and program products according to various example embodiments. It will be understood that the actions and functionality may be implemented at least in part by program instructions. These program instructions may be provided to a processor of an electronic device, including a special purpose information handling device, or other programmable data processing device to produce a machine, such that the instructions, which execute via a processor of the device implement the functions/acts specified.

It is worth noting that while specific blocks are used in the figures, and a particular ordering of blocks has been illustrated, these are non-limiting examples. In certain contexts, two or more blocks may be combined, a block may be split into two or more blocks, or certain blocks may be re-ordered or re-organized as appropriate, as the explicit illustrated examples are used only for descriptive purposes and are not to be construed as limiting.

As used herein, the singular "a" and "an" may be construed as including the plural "one or more" unless clearly indicated otherwise.

This disclosure has been presented for purposes of illustration and description but is not intended to be exhaustive or limiting. Many modifications and variations will be apparent to those of ordinary skill in the art. The example embodiments were chosen and described in order to explain principles and practical application, and to enable others of ordinary skill in the art to understand the disclosure for various embodiments with various modifications as are suited to the particular use contemplated.

Thus, although illustrative example embodiments have been described herein with reference to the accompanying figures, it is to be understood that this description is not limiting and that various other changes and modifications may be affected therein by one skilled in the art without departing from the scope or spirit of the disclosure.

What is claimed is:

1. A method, comprising:
    detecting, at an electronic device, a wireless signal associated with an input device, wherein the detecting comprises detecting the wireless signal at a specified spatial range of the electronic device, wherein the specified spatial range comprises a predetermined portion of a display screen of the electronic device and a non-contact, aerial hover region above the predetermined portion of the display screen;
    identifying, using a processor, a data set corresponding to the wireless signal;
    analyzing the data set to determine an identity characteristic of the input device; and
    pairing, based on the analyzing, the electronic device with the input device.

2. The method of claim 1, wherein the detecting comprises detecting the wireless signal when the input device exceeds a proximity threshold associated with the electronic device.

3. The method of claim 1, wherein the detecting comprises detecting the wireless signal at a specified spatial range of the electronic device.

4. The method of claim 3, wherein the specified spatial range comprises a region of the electronic device selected from a group consisting of a region of a display screen of the electronic device and a region above the selected region of the display screen.

5. The method of claim 3, wherein the specified spatial range may be adjustably set by a user.

6. The method of claim 1, wherein the data set comprises an input device identifier specific to the input device.

7. The method of claim 6, further comprising extracting a specified data segment from the input device identifier.

8. The method of claim 7, wherein the specified data segment comprises a Media Access Control (MAC) address of the input device.

9. The method of claim 1, wherein the pairing comprises pairing the identity characteristic of the input device with an identity characteristic of the information handling device.

10. The method of claim 9, wherein the identity characteristic comprises a Media Access Control (MAC) address.

11. An electronic device, comprising:
    a processor;
    a memory device that stores instructions executable by the processor to:
    detect a wireless signal associated with an input device, wherein the detecting comprises detecting the wireless signal at a specified spatial range of the electronic device, wherein the specified spatial range comprises a predetermined portion of a display screen of the electronic device and a non-contact, aerial hover region above the predetermined portion of the display screen;
identify a data set corresponding to the wireless signal;
analyze the data set to determine an identity characteristic of the input device; and
pair, based on the analyzing, the electronic device with the input device.

12. The electronic device of claim 11, wherein the instructions executable by the processor to detect further comprise instructions executable by the processor to detect the wireless signal when the input device exceeds a proximity threshold associated with the electronic device.

13. The electronic device of claim 11, wherein the instructions executable by the processor to detect further comprise instructions executable by the processor to detect the wireless signal at a specified spatial range of the electronic device.

14. The electronic device of claim 13, wherein the specified spatial range comprises a region of the electronic device selected from a group consisting of a region of a display screen of the electronic device and a region above the selected region of the display screen.

15. The electronic device of claim 13, wherein the specified spatial may be adjustably set by a user.

16. The electronic device of claim 11, wherein the data set comprises an input device identifier specific to the input device.

17. The electronic device of claim 16, wherein the instructions are further executable by the processor to extract a specified data segment from the input device identifier.

18. The information handling device of claim 17, wherein the specified data segment comprises a Media Access Control (MAC) address of the input device.

19. The electronic device of claim 18, wherein the instructions executable by the processor to pair further comprise instructions executable by the processor to pair the identity characteristic of the input device with an identity characteristic of the electronic device.

20. A product, comprising:
a storage device that stores code, the code being executable by a processor and comprising:
code that detects a wireless signal associated with an input device, wherein the detecting comprises detecting the wireless signal at a specified spatial range of the electronic device, wherein the specified spatial range comprises a predetermined portion of a display screen of the electronic device and a non-contact, aerial hover region above the predetermined portion of the display screen;
code that identifies a data set corresponding to the wireless signal;
code that analyzes the data set to determine an identity characteristic of the input device; and
code that pairs, based on the analyzing, an electronic device with the input device.

* * * * *